US012769108B2

(12) United States Patent
Radu et al.

(10) Patent No.: US 12,769,108 B2
(45) Date of Patent: Oct. 20, 2026

(54) MOBILE MICROSCOPE TO ANALYZE SAMPLES USING A MACHINE LEARNING CLASSIFICATION NETWORK

(71) Applicant: Microchip Technology Incorporated, Chandler, AZ (US)

(72) Inventors: Cristina-Georgeta Radu, Bucharest (RO); Valentin Stoia, Bucharest (RO)

(73) Assignee: Microchip Technology Incorporated, Chandler, AZ (US)

( * ) Notice: Subject to any disclaimer, the term of this patent is extended or adjusted under 35 U.S.C. 154(b) by 290 days.

(21) Appl. No.: 18/589,479

(22) Filed: Feb. 28, 2024

(65) Prior Publication Data

US 2025/0237858 A1 Jul. 24, 2025

Related U.S. Application Data

(60) Provisional application No. 63/624,448, filed on Jan. 24, 2024.

(51) Int. Cl.
*G02B 21/36* (2006.01)
*G02B 21/26* (2006.01)

(52) U.S. Cl.
CPC ........... *G02B 21/361* (2013.01); *G02B 21/26* (2013.01); *G02B 21/365* (2013.01)

(58) Field of Classification Search
CPC ..... G02B 21/361; G02B 21/26; G02B 21/365
See application file for complete search history.

(56) References Cited

FOREIGN PATENT DOCUMENTS

CN 116109809 A 5/2023 ............. G06V 10/12

OTHER PUBLICATIONS

Siddique et al. ("Biomolecular Analysis of Soil Samples and Rock Imagery for Tracing Evidence of Life Using a Mobile Robot", 2023 IEEE 8th ICRAE, IEEE, Dec. 2, 2023 (Dec. 2, 2023), pp. 1-6, XP034561182, DOI: 10.1109/ICRAIE59459.2023.10468310) (Year: 2023).*

Mallery et al. ("Design and Experiments with a Robot-Driven Underwater Holographic Microscope for Low-Cost In Situ Particle Measurements", Journal of Intelligent, Springer Netherlands, Dordrecht, vol. 102, No. 2, May 14, 2021 (May 14, 2021), XP037476740, ISSN: 0921-0296, DOI: 10.1007/S10846-021-01404-3) (Year: 2021).*

"Application Note AC290: Trainable Image Recognition System Using Low Power Flash FPGAs," Actel, URL: https://ww1.microchip.com/downloads/aemDocuments/documents/FPGA/ApplicationNotes/ApplicationNotes/flash_image_recog_ab.pdf, 5 pages, Nov. 2006.

(Continued)

*Primary Examiner* — Nathanael R Briggs
(74) *Attorney, Agent, or Firm* — SLAYDEN GRUBERT BEARD PLLC

(57) ABSTRACT

A system and method for a mobile microscope is disclosed. The system includes a platform to move about an environment; a sampler tool coupled to the platform; a microscope coupled to the platform; a camera coupled to the microscope; and a control circuit to: instruct the platform to move about an environment; instruct the sampler tool to obtain a sample and place the sample in a view field of the microscope; instruct the camera to capture an image of the sample, the image enlarged by the microscope; receive the image from the camera; analyze, using a neural network, the image to classify the sample; and output a classification of the sample.

20 Claims, 6 Drawing Sheets

(56) References Cited

OTHER PUBLICATIONS

Mallery, Kevin et al., "Design and Experiments with a Robot-Driven Underwater Holographic Microscope for Low-Cost In Situ Particle Measurements," Journal of Intelligent & Robotic Systems, vol. 102, No. 32, 11 pages, May 14, 2021.

Siddique, Shah Md Ahasan et al., "Biomolecular Analysis of Soil Samples and Rock Imagery for Tracing Evidence of Life Using a Mobile Robot," IEEE $8^{th}$ International Conference on Recent Advances and Innovations in Engineering, 6 pages, Dec. 2, 2023.

International Search Report and Written Opinion, Application No. PCT/US2024/038642, 12 pages, Dec. 25, 2024.

* cited by examiner

MOBILE MICROSCOPE TO ANALYZE SAMPLES USING A MACHINE LEARNING CLASSIFICATION NETWORK

PRIORITY

This application claims priority to U.S. Provisional Patent Application No. 63/624,448, filed Jan. 24, 2024, the contents of which are hereby incorporated in their entirety.

TECHNICAL FIELD

The present disclosure relates to a mobile microscope used to analyze samples using a neural network.

BACKGROUND

Microscopes are used in a variety of scientific applications, such as medical, environmental, biological, and geological research. Many research applications require humans to manually collect, prepare, and analyze samples using a microscope. This type of research is time consuming, slow, and expensive. Additionally, collecting samples from hostile environments (e.g., volcanic or radioactive areas) may be dangerous.

Thus, there is a need for a device to collect, prepare, and analyze samples in an automated manner to reduce the cost and increase the speed of research while ensuring the safety of research personnel.

SUMMARY OF THE INVENTION

Aspects provide systems and methods for a mobile microscope platform used to analyze samples using a neural network is disclosed. A system includes a platform to move about an environment; a sampler tool coupled to the platform; a microscope coupled to the platform; a camera coupled to the microscope; and a control circuit to: instruct the platform to move about an environment; instruct the sampler tool to obtain a sample and place the sample in a view field of the microscope; instruct the camera to capture an image of the sample, the image enlarged by the microscope; receive the image from the camera; analyze, using a neural network, the image to classify the sample; and output a classification of the sample.

A method includes instructing a platform to move about an environment; instructing a sampler tool coupled to the platform to obtain a sample and place the sample in a view field of a microscope coupled to the platform; instructing a camera coupled to the microscope to capture an image of the sample, the image enlarged by the microscope; receiving the image from the camera; analyzing, using a neural network, the image to classify the sample; and outputting a classification of the sample.

A system includes a control circuit to: instruct a platform to move about an environment; instruct a sampler tool coupled to the platform to obtain a sample and place the sample in a view field of a microscope coupled to the platform; instruct a camera coupled to the microscope to capture an image of the sample, the image enlarged by the microscope; receive the image from the camera; analyze, using a neural network, the image to classify the sample; and output a classification of the sample.

BRIEF DESCRIPTION OF THE DRAWINGS

The figures illustrate examples of systems and methods for a mobile microscope platform used to analyze samples using a neural network.

The reference number for any illustrated element that appears in multiple different figures has the same meaning across the multiple figures, and the mention or discussion herein of any illustrated element in the context of any particular figure also applies to each other figure, if any, in which that same illustrated element is shown.

DESCRIPTION

According to an aspect of the invention, a mobile microscope platform used to analyze samples using a neural network is provided. The mobile microscope platform may enable sample collection from unfriendly environments (e.g., volcanic, toxic, contaminated, or radioactive environments), reduces the cost of research, reduce the human work required to perform research, increase the speed of research, and may allow researchers to discover new specimens (e.g., bacteria, cells, or viruses) without human interaction or with minimal human interaction.

Figure 1:
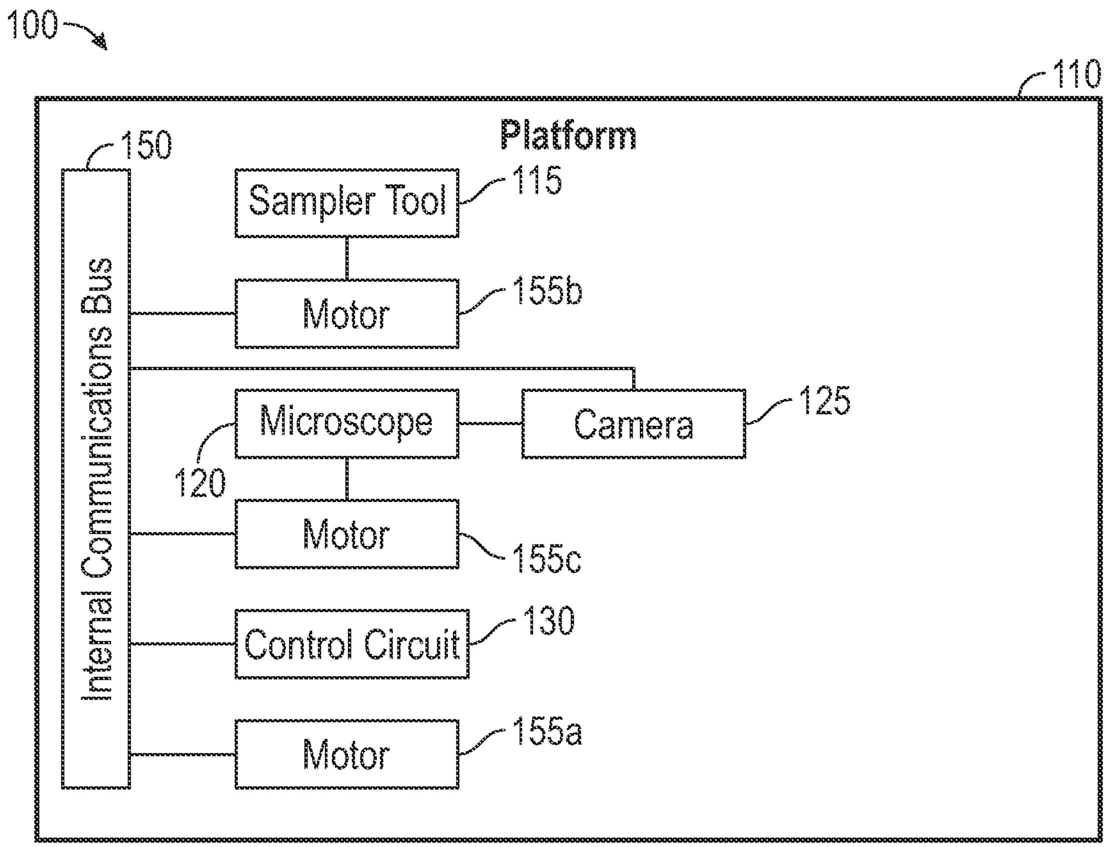
FIG. 1 is a block diagram of a system used to analyze samples using a neural network, according to examples of the present disclosure.

FIG. 1 is a block diagram of a system used to analyze samples using a neural network, according to examples of the present disclosure. Mobile microscope 100 may include platform 110. Platform 110 may include sampler tool 115, microscope 120, camera 125, control circuit 130, internal communication bus 150, and motors 155 (illustrated as motors **155*a*, 155*b* and 155*c***).

Platform 110 may be any type of mobile device, such as a robot equipped with wheels and/or legs, a drone, or any other device suitable for moving around an environment to collect samples that can be viewed using microscope 120 and camera 125. Platform 110 moves about its environment using one or more motors 155. Specifically, using motors **155*a*, mobile microscope 100 may move along Cartesian coordinates (e.g., x, y, and z axes) around the environment. Motors 155** are described in more detail below.

Sampler tool 115, microscope 120, camera 125, and associated motors **155*a* and 155*b* may be used to collect and image samples in response to instructions received from control circuit 130 (described below) and send images of samples to control circuit 130 using internal communications bus 150**.

Specifically, sampler tool 115 may be a device used to collect samples from the environment about mobile microscope 100. For example, sampler tool 115 may be a robotic arm with a collection device coupled to one end. The collection device may be a pick-and-place arm capable of picking up objects, a shovel capable of scooping up an object, a drill capable of obtaining a core sample, or any other device suitable for collecting a sample from the environment and placing it in a location onboard mobile microscope 100 to enable microscope 120 to image the sample (e.g., in the view field of microscope 120). Sampler tool 115 may be moved using one or more motor 155*b*, described in more detail below. In examples where sampler tool 115 includes a robotic arm, the robotic arm may allow movement in up to six degrees of movement such that sampler tool 115 can obtain samples from a variety of positions and place samples in the view field of microscope 120.

In some examples, the samples collected by sampler tool 115 may be further processed before viewing with microscope 120. For example, water or other chemical agents may be added to a sample to trigger a chemical reaction. In other examples, a sample may be filtered to remove impurities. Sampler tool 115 may include onboard storage of additional materials (e.g., water, chemical agents) that it may add to the sample or additional tools (e.g., filter, heat source, lasers, ultraviolet (UV) light source, radiation type emitter, bacterial disperser, vibration device, sound emitter, air suction device) used to process the sample prior to placing the sample in the view field of microscope 120.

Microscope 120 may be any suitable device for magnifying samples such that an image of the sample may be captured by camera 125. Microscope 120 may be coupled to platform 110 using any suitable attachment mechanism, such as a clamp, a suction device, glue or other adhesive, bolt or other fastener. Microscope 120 may be a simple optical microscope, a compound optical microscope, a digital microscope, or any other microscope suitable for capturing images of samples. Microscope 120 may be controlled using motors 155*c*. Motors 155*c* are described in more detail below. For example, the inclination and/or zoom level of microscope 120 may be adjusted using motors 155*c*. Additionally, microscope 120 may move along Cartesian coordinates (e.g., x, y, and z axes) using motors 155*c* to allow microscope 120 and camera 125 to capture images of different portions of a sample. In some examples, motors 155*c* may comprise three servo motor controls: one for the x-y plane, one for the z-axis, and one for inclination.

Figure 5:
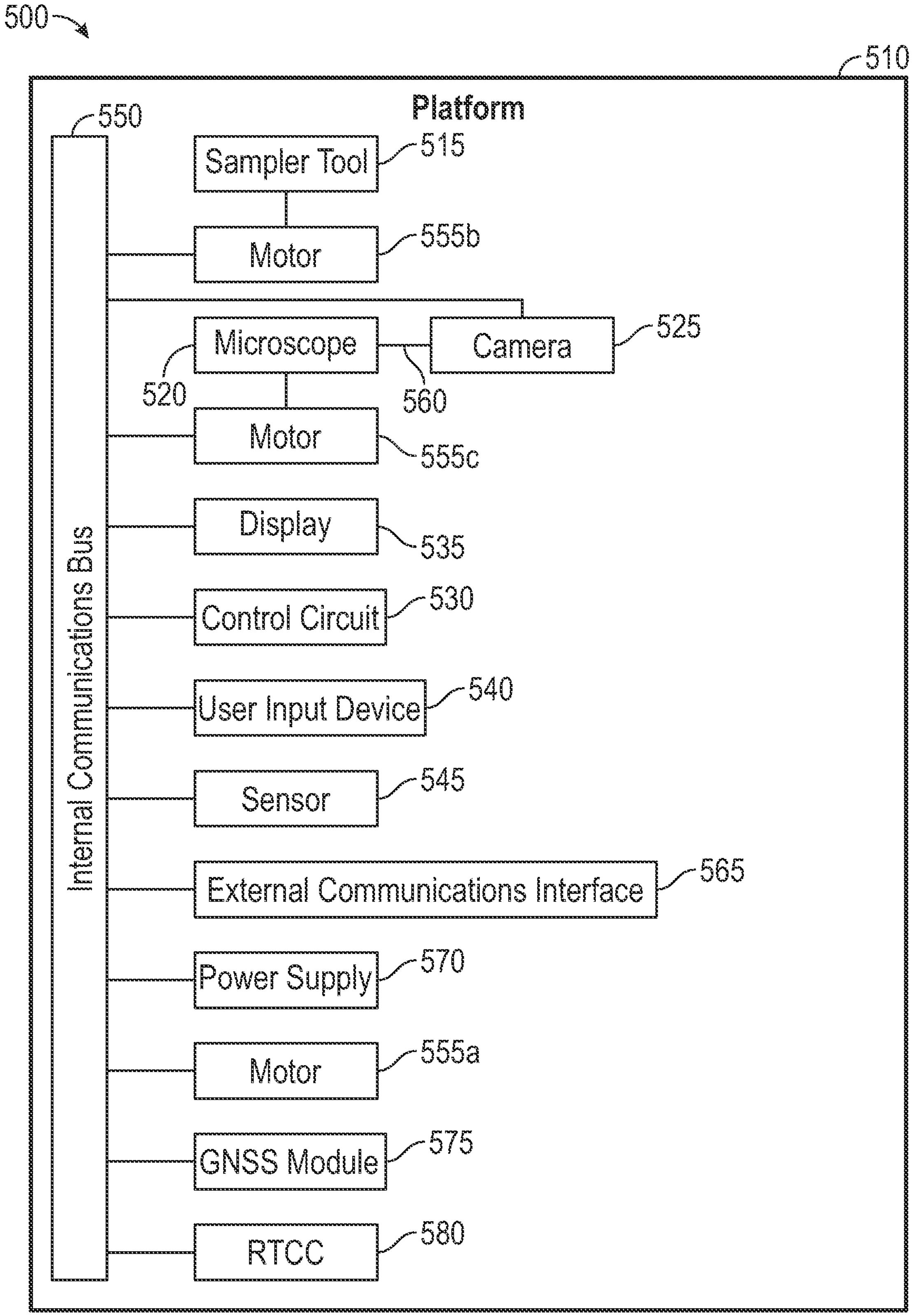
FIG. 5 is a more detailed block diagram of a system shown in FIG. 1, according to examples of the present disclosure.

Microscope 120 may also contain a light source that is controlled by control circuit 130 and powered by a power supply, such as power supply 570 shown in FIG. 5. Control circuit 130 may use artificial intelligence and/or information from one or more sensors, such as sensors 545 shown in FIG. 5, to determine the appropriate light conditions for viewing the sample and adjust the light source accordingly. For example, control circuit 130 may adjust the light source for the environment based on information from one or more sensors, which may comprise a light sensor.

Camera 125 may be coupled to microscope 120 via a camera-lens connection, such as camera-lens connection 560 shown in FIG. 5, and camera 125 may be used to capture an image of the output from microscope 120. Camera 125 may be any suitable type of digital image sensor, such as a charge-coupled device (CCD) or common complementary metal-oxide semiconductor (CMOS). Camera 125 may output the captured image to control circuit 130.

Control circuit 130 may classify the sample from the image captured by camera 125, receive data from sensors, control the movement of platform 110, sampler tool 115, and microscope 120, and manage communication of data among the components of mobile microscope 100 and between mobile microscope 100 and external servers. Control circuit 130 may be implemented in any suitable combination of analog and digital circuitry, such as a suitable microprocessor, control board, or other computing device having input and output interfaces for communicating with other devices, as well as memory or other storage for program logic/instructions that control circuit 130 executes to send and receive signals and process data. In some examples, control circuit 130 may be divided into multiple components. For example, control circuit 130 may include a field-programmable gate array (FPGA) to perform the analysis to identify and classify a sample and a microcontroller to control mobile microscope 100.

Control circuit 130 may include a database and a neural network for analyzing, identifying, and classifying a sample from the images of the sample captured by camera 125. Control circuit 130 may save an image of the sample to the database. The neural network may then be retrained with images saved to the database to recognize and classify the sample. In some examples, the neural network may additionally include information about the samples (e.g., that a sample is known to replicate, mutate, or break down in certain conditions or that a sample is known to have certain reactions or resistance to environmental changes (e.g., temperature changes, humidity changes, changes in radiation levels, changes in the amount of sunlight, changes in composition of certain gases)) to assist in the identification of the sample.

The neural network may be retrained in real-time with images captured by camera 125 and/or be retrained with additional images provided by a user. In some examples, the neural network may be based on the environment in which mobile microscope 100 operates. For example, one neural network may be used in volcanic environments and a different neural network may be used in arctic environments.

Control circuit 130 may control communications among the components of mobile microscope 100. For example, control circuit 130 may receive instructions from a user input device, such as user input device 540 shown in FIG. 5, and convert those instructions in to commands to the components of mobile microscope 100. As a specific example, control circuit 130 may receive an instruction for mobile microscope 100 to move about the environment and control circuit 130 may control motors 155*a* to cause mobile microscope 100 to move.

Internal communication bus 150 may be any suitable type of digital or analog communication interface used to transfer data between the components of mobile microscope 100. For example, internal communication bus 150 may be an Inter-Integrated Circuit (I2C) bus, Peripheral Component Interconnect Express (PCIe) bus, Serial Peripheral Interface (SPI) bus, or any other suitable communication bus.

Motors 155*a*, 155*b*, and 155*c* may be activated to move platform 110, sampler tool 115, and microscope 120, respectively. Motors 155*a*, 155*b*, and 155*c* (collectively "motors 155") may be brushless direct current (BLDC), brushed direct current, geared direct current, stepper, or servo motors, or any other suitable type of motor for controlling movement of platform 110, sampler tool 115, and microscope 120, including any combination of type of motors. For example, one type of motor may be used for large movements, such as moving platform 110 or sampler tool 115, while another type of motor may be used for fine movements, such as the movements of microscope 120. Motors 155 may be activated in response to commands from control circuit 130.

Figure 2:
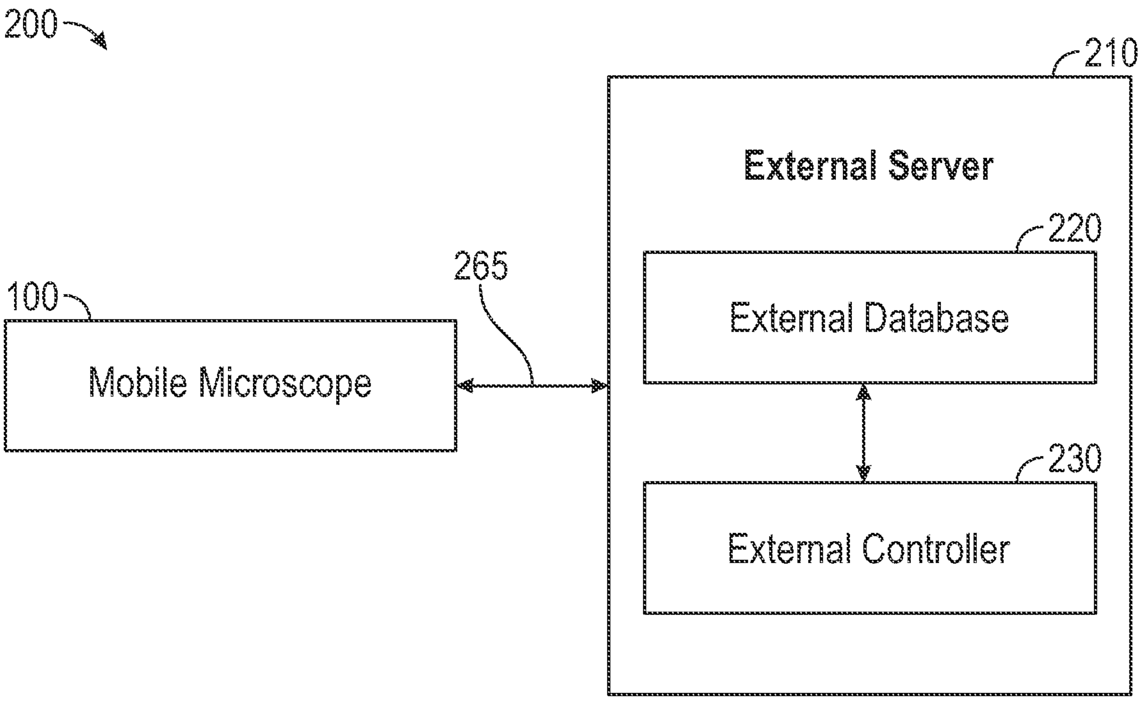
FIG. 2 illustrates a system for a mobile microscope platform communicating with an external database and external controller, according to examples of the present disclosure.

FIG. 2 illustrates a system for a mobile microscope platform communicating with an external database and external controller, according to examples of the present disclosure. As explained above, mobile microscope 100 may communicate with external server 210 to receive instructions, transmit data, coordinate with other mobile microscopes 100, and/or receive updates to the neural network.

External server 210 may include external database 220 and external controller 230. External database 220 may be any type of database suitable for storing a neural network, data and images captured by mobile microscope 100, and data and images used to train the artificial intelligence used by mobile microscope 100. External database 220 may be stored in random-access memory (RAM), read-only memory (ROM), volatile, non-volatile, registers, or any other suitable memory.

External controller 230 may be implemented in any suitable combination of analog and digital circuitry, such as a suitable microprocessor, microcontroller, control board, or other computing device having input and output interfaces for communicating with other devices, as well as memory or other storage for program logic/instructions that external controller 230 executes to send and receive signals and process data. A user may interface with mobile microscope 100 using external controller 230. In some examples, external controller 230 may perform some of the functions of control circuit 130 as described with respect to FIG. 1 including analyzing, identifying, and classifying samples from the images captured by camera 125.

Mobile microscope 100 may communicate with external server 210 via external communications interface 265 using any suitable communication protocol including, but not limited to, Wi-Fi, Bluetooth, GSM, LoRa, Ultra Wideband (UWB), Universal Serial Bus. (USB), Ethernet, or satellite.

Figure 3:
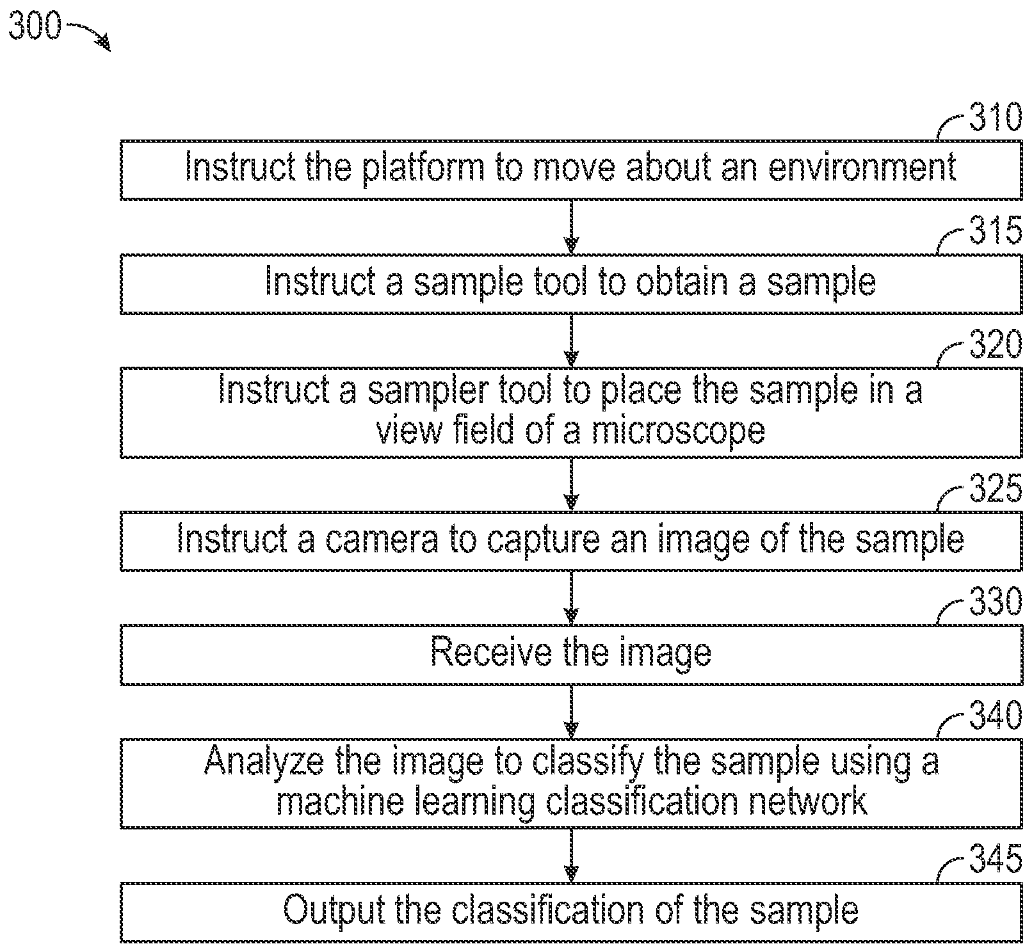
FIG. 3 illustrates a method of using a mobile microscope platform, according to examples of the present disclosure.

FIG. 3 illustrates a method of using a mobile microscope platform, according to examples of the present disclosure. Method 300 may be implemented using a control circuit, such as control circuit 130 or control circuit 530 shown in FIGS. 1 and 5, by itself or in combination with a processor, or any other system operable to implement method 300. Although examples have been described above, other variations and examples may be made from this disclosure without departing from the spirit and scope of these disclosed examples.

Method 300 may begin at block 310, the control circuit may instruct the platform to move about an environment. The platform may travel to a target area where it is to search for samples. After the mobile microscope arrives at the target area, it may move about its location on legs and/or wheels to adjust its location and position.

At block 315, the control circuit may instruct a sampler tool to obtain a sample. At block 320, the control circuit may instruct the sampler tool to place the sample in a view field of a microscope.

At block 325, the control circuit may instruct a camera coupled to the microscope to capture an image of the sample. In some examples, the control circuit may adjust the microscope (e.g., the lens, zoom, and/or light source) to view the sample. An image of the output of the microscope may be captured by the camera. At block 330, the control circuit may receive the image from the camera.

At block 340, the control circuit may analyze the image to classify the sample using a neural network. For example, where the control circuit is instructed to identify an unknown sample, the control circuit may classify a sample as "unknown" when, for example, the control circuit has less than 30% confidence in the accuracy of its classification of the sample. However, other confidence thresholds may be set by the user. In an example where the control circuit is instructed to identify a specific type of sample, the control circuit may set a confidence threshold for when mobile microscope 100 has identified a sample. For example, when the control circuit has more than 80% confidence in the accuracy of its classification of the sample, the control circuit determines that the sample is accurately identified and determines whether it matches the specific type of sample the mobile microscope is to locate. The control circuit may also use the measurement of the environment when classifying the sample.

At block 345, the control circuit may output the classification of the sample. The classification may be output to a display on the platform, to an external server, or both.

Although FIG. 3 discloses a particular number of operations related to method 300, method 300 may be executed with greater or fewer operations than those depicted in FIG. 3. In addition, although FIG. 3 discloses a certain order of operations to be taken with respect to method 300, the operations comprising method 300 may be completed in any suitable order.

Figure 4:
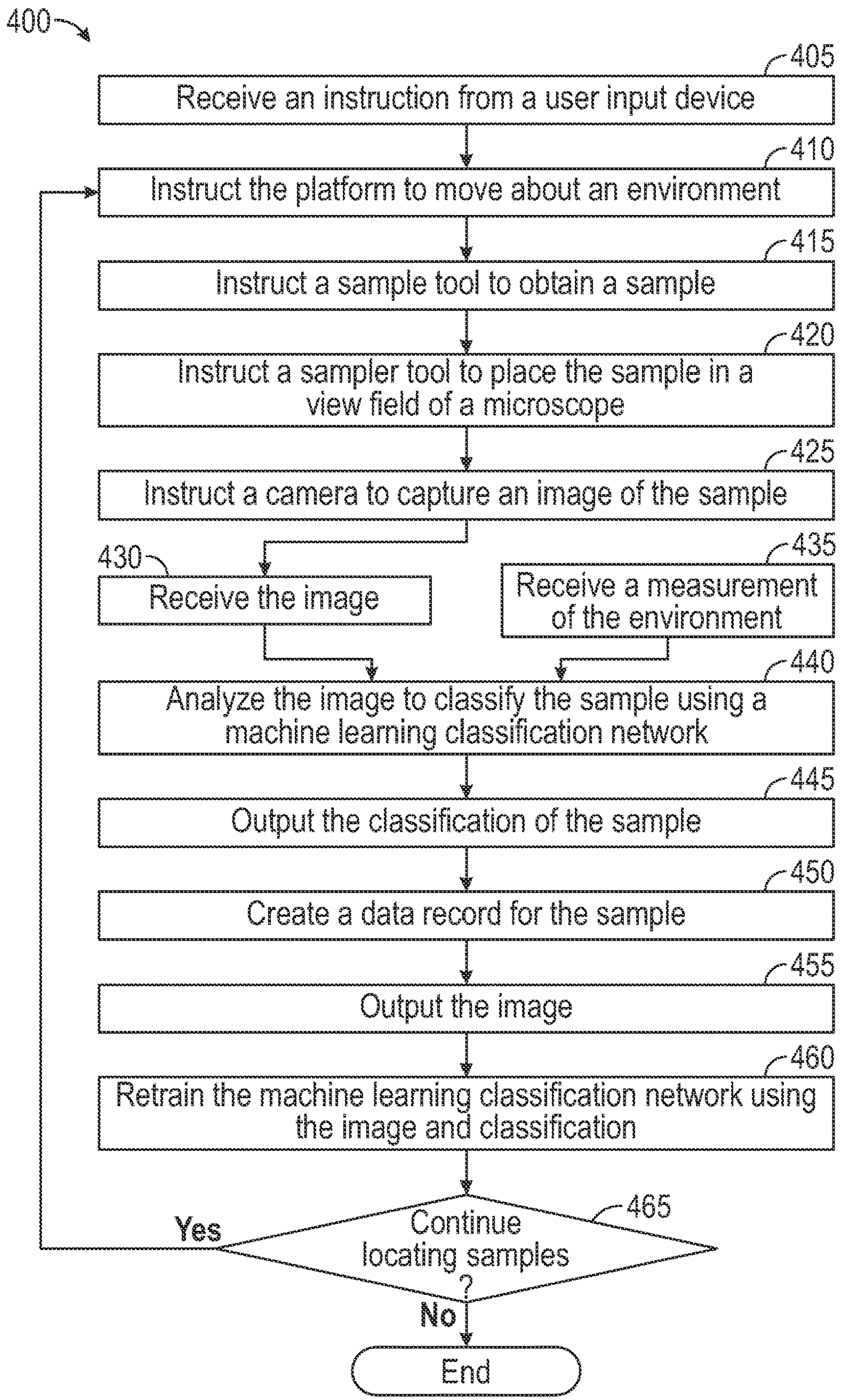
FIG. 4 illustrates a more detailed version of the method of FIG. 3, according to examples of the present disclosure.

FIG. 4 illustrates a more detailed version of the method of FIG. 3, according to examples of the present disclosure. Method 400 may be implemented using a control circuit, such as control circuit 130 or control circuit 530 shown in FIGS. 1 and 5, by itself or in combination with a processor, or any other system operable to implement method 400. Although examples have been described above, other variations and examples may be made from this disclosure without departing from the spirit and scope of these disclosed examples.

Method 400 may begin at block 405 where the control circuit may receive an instruction from a user input device. According to one example, a user may instruct the mobile microscope to identify samples (e.g., cells, bacteria) that are unknown. According to another example, a user may instruct the mobile microscope to identify a specific type of sample (e.g., a specific cell, bacteria).

At block 410, the control circuit may instruct the platform to move about an environment. The platform may travel to a target area where it is to search for samples. After the mobile microscope arrives at the target area, it may move about its location on legs and/or wheels to adjust its location and position.

At block 415, the control circuit may instruct a sampler tool to obtain a sample. At block 420, the control circuit may instruct the sampler tool to place the sample in a view field of a microscope.

At block 425, the control circuit may instruct a camera coupled to the microscope to capture an image of the sample. In some examples, the control circuit may adjust the microscope (e.g., the lens, zoom, and/or light source) to view the sample. An image of the output of the microscope may be captured by the camera.

At block 430, the control circuit may receive the image from the camera. At block 435, the control circuit may receive a measurement of the environment from one or more sensors.

At block 440, the control circuit may analyze the image to classify the sample using a neural network. For example, where the control circuit is instructed to identify an unknown sample, the control circuit may classify a sample as "unknown" when, for example, the control circuit has less than 30% confidence in the accuracy of its classification of the sample. However, other confidence thresholds may be set by the user. In an example where the control circuit is instructed to identify a specific type of sample, the control circuit may set a confidence threshold for when mobile microscope 100 has identified a sample. For example, when the control circuit has more than 80% confidence in the accuracy of its classification of the sample, the control circuit determines that the sample is accurately identified and determines whether it matches the specific type of sample the mobile microscope is to locate. The control circuit may also use the measurement of the environment when classifying the sample.

At block 445, the control circuit may output the classification of the sample. The classification may be output to a display on the platform, to an external server, or both.

At block 450, the control circuit may create a data record for the sample. The control circuit may couple information received from environmental sensors, RTCC, and/or a GNSS module with the results of the analysis performed at block 440 to record information about the location, time, and environment from which the sample was taken and analyzed. In some examples, the data record may be output to a display and/or to an external server.

At block 455, the control circuit may output the image to a display and/or external server. At block 460, the control circuit may retrain the neural network using the image and the classification.

At block 460, the control circuit may determine whether it is to continue locating additional samples. For example, where the control circuit is instructed to identify an unknown sample, the mobile microscope may move about its environment (block 410), collecting and scanning samples (blocks 415, 420, 425, 430, 440), until it identifies an unknown sample at which point the mobile microscope may stop its movement and displays the result of its search of an unknown sample on a display and/or sends the result to an external server (blocks 445, 455). The mobile microscope may remain stopped, awaiting further instructions, or proceed to identify a second unknown sample. In an example where the control circuit is instructed to identify a specific type of sample, the mobile microscope may move about its environment (block 410), collecting and scanning samples (blocks 415, 420, 425, 430, 440), until it identifies the desired sample at which point the mobile microscope may stop its movement and displays the result of its search on a display and/or sends the result to an external server (blocks 445, 455). The mobile microscope may remain stopped, awaiting further instructions, or proceed to identify a second instance of the desired sample.

Although FIG. 4 discloses a particular number of operations related to method 400, method 400 may be executed with greater or fewer operations than those depicted in FIG. 4. In addition, although FIG. 4 discloses a certain order of operations to be taken with respect to method 400, the operations comprising method 400 may be completed in any suitable order.

FIG. 5 is a more detailed block diagram of a system shown in FIG. 1, according to examples of the present disclosure. Mobile microscope 500 may be similar to mobile microscope 100 and include platform 510, sampler tool 515, microscope 520, camera 525, control circuit 530, internal communication bus 550, motors 555 (illustrated as motors 555*a*, 555*b* and 555*c*), similar to platform 110, sampler tool 115, microscope 120, camera 125, control circuit 130, internal communication bus 150, motors 155 (illustrated as motors 155*a*, 155*b* and 155*c*) shown in FIG. 1. Mobile microscope 500 may also include display 535, user input device 540, one or more sensors 545, camera-lens connection 560, external communications interface 565, power supply 570, global navigation satellite system (GNSS) module 575, and real-time clock/calendar (RTCC) 580.

Camera-lens connection 560 may be a solid connection such that microscope 520 and camera 525 may move together. In some examples of mobile microscope 500, where microscope 520 does not move, camera-lens connection 560 may not be present.

Display 535 and user input device 540 may be installed on an external surface of platform 510 such that display 535 is visible to a user and user input device 540 is accessible to a user. Display 535 may be a liquid crystal display (LCD), light emitting diode (LED), organic LED (OLED), or any other suitable display for presenting the image captured by camera 525. Display 535 may present the results of the analysis performed by control circuit 530. For example, display 535 may display an image along with the classification of the image as determined by control circuit 530. In some examples, display 535 may be a touch screen display, and thereby may integrate user input device 540 within display 535 so as to allow the user to interact with the image and displayed information (e.g., allow the user to zoom in on portions of the image).

User input device 540 may be a touch screen, keyboard, touch pad, trackball, joystick, or any other suitable device for allowing a user to interact with mobile microscope 500. User input device 540 may work in conjunction with display 535. For example, information may be presented on display 535 and the user may interact with user input device 540 to scroll through the presented information, navigate menus, enter data, or other available operations. In some examples, user input device 540 may include a display (such as when user input device 540 is a touch screen) that presents the data, menus, or command fields with which the user interfaces. Examples of interactions between a user and user input device 540 include, but are not limited to, inputting a desired specimen for which mobile microscope 500 is to search in the environment, instructing control circuit 530 to zoom and move microscope 520, instructing control circuit 530 to capture photos of the sample using camera 525, or instructing control circuit 530 to add the image to the neural network.

Sensors 545 may be one or more sensors to obtain data about the environment surrounding mobile microscope 500 including, but not limited to, light sensors, temperature sensors, humidity sensors, gas composition sensors (e.g., oxygen sensors, carbon dioxide sensors), radiation sensors, infrared sensor, ultrasound sensor, image recognition sensor, thermal imaging sensor, sound receiver (e.g., microphone), and/or atmospheric sensors. Control circuit 530 may combine the information received from sensors 545 with the image captured by camera 525 to classify the sample more accurately. For example, the neural network may include information about the temperatures at which a particular type of specimen may be found. The neural network may use the temperature information from sensors 545 to reduce the number of potential specimens when classifying the sample.

Internal communication bus 550 may be any suitable type of digital or analog communication interface used to transfer data between the components of mobile microscope 500. For example, internal communication bus 550 may be an Inter-Integrated Circuit (I2C) bus, Peripheral Component Interconnect Express (PCIe) bus, Serial Peripheral Interface (SPI) bus, or any other suitable communication bus.

External communications interface 565 may enable communications between mobile microscope 500 and external servers (not expressly shown). For example, external communications interface 565 may be Wi-Fi, Bluetooth, Global System for Mobile Communications (GSM), Low Power, Wide Area (LPWA) (e.g., LoRa), Ultra Wideband (UWB), Universal Serial Bus. (USB), Ethernet, satellite, or other suitable wired or wireless or mobile communications interface. Mobile microscope 500 may communicate with external servers (e.g., a server, the cloud, and/or an external coordinator) to receive instructions, transmit data, coordinate with other mobile microscopes 500, and/or receive updates to the neural network. In some examples, external communications interface 565 may include a Universal Serial Bus (USB) port to allow a user to transmit and receive data using USB (e.g., downloading data to a personal computer in Joint Photographic Experts Group (JPEG) or other file formats).

Power supply 570 may be one or more batteries to provide power to the components of mobile microscope 500. Power supply 570 may be a lithium-ion (Li-Ion) battery, a lithium iron phosphate (LiFePO4) battery, nickel-metal hydride (Ni-MH) battery, a lithium polymer (Li-Po) battery, any other suitable battery, or any combination thereof. In some examples, power supply 570 may include solar panels to recharge the batteries. Power supply 570 may further include power management devices, such as integrated circuits that monitor the battery charging process.

GNSS module 575 to enable mobile microscope 500 to determine its geo location. Control circuit 530 may record the geo-location of a collection point of a sample.

RTCC 580 may maintain accurate time within mobile microscope 500, including while mobile microscope 500 is powered off. In some examples, control circuit 530 may combine the data received from sensors 545 with information from RTCC 580 to assist the neural network in more accurately classifying a sample. For example, the results of the analysis of a sample, along with sensor information, may be time stamped. An algorithm in control circuit 530 may compare the analysis of a sample at different points in time to obtain an overall more accurate classification by averaging the confidence level in the identification obtained at each classification time. As another example, the neural network may receive images of a sample over time and perform real time analysis of how the sample changes over time (e.g., to observe cell mutation in real-time).

Figure 6A:
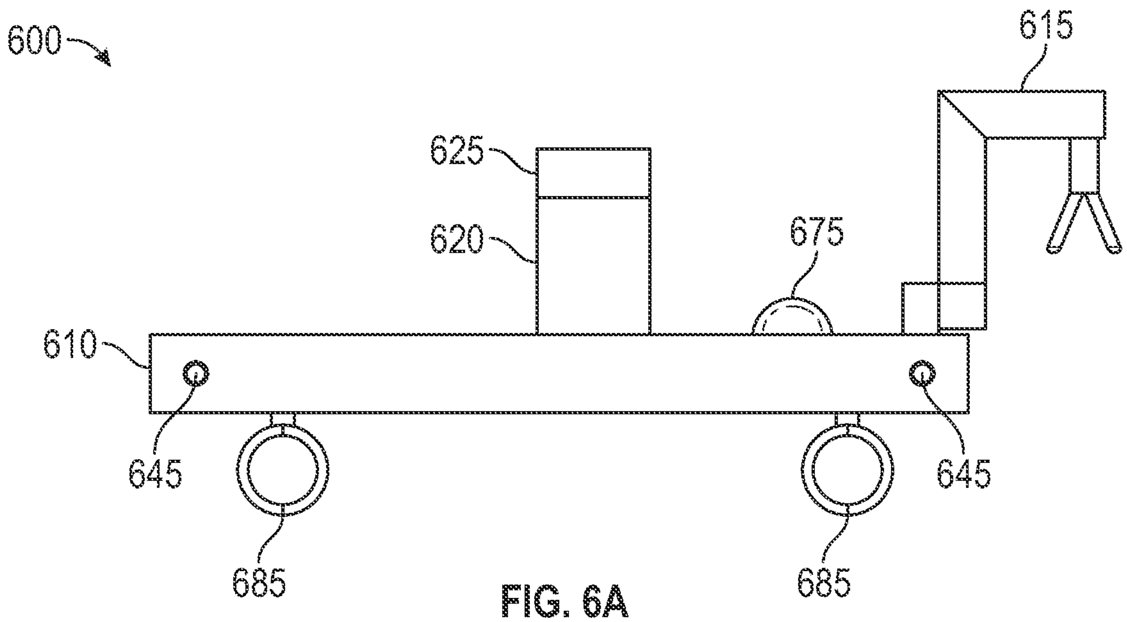
FIGS. 6A and 6B illustrate a mobile microscope platform, according to examples of the present disclosure.
Figure 6B:
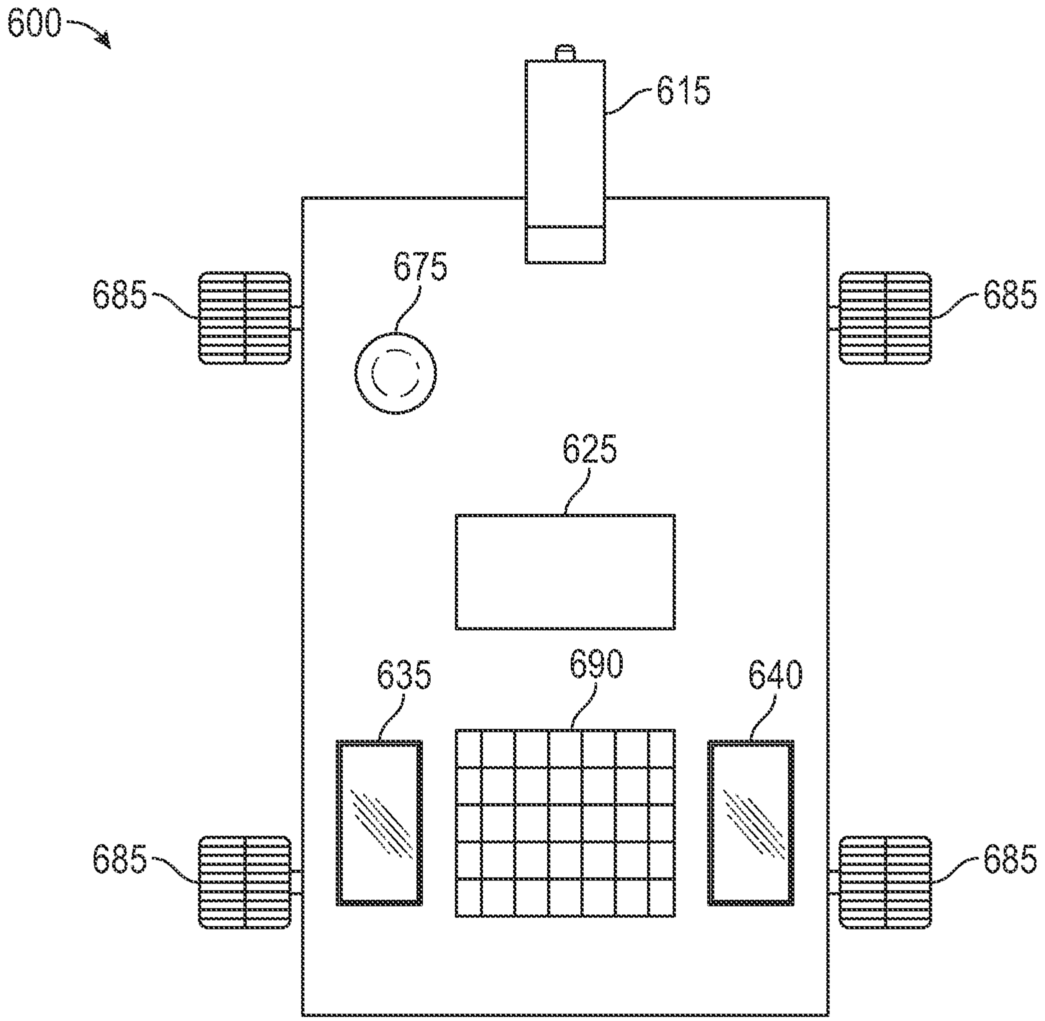

FIGS. 6A and 6B illustrate a mobile microscope, according to examples of the present disclosure. FIG. 6A is a side view and FIG. 6B is a top view. Mobile microscope 600 may include platform 610, sampler tool 615, microscope 620, camera 625, display 635, user input device 640, sensors 645, GNSS module 675, wheels 685, and solar panel 690. Mobile microscope 600 may also include motors, a control circuit, a power supply, an internal communications bus, and an external communications interface housed within platform 610 (not expressly shown in FIGS. 6A and 6B). These components are similar to motors 155, control circuit 130, power supply 570, internal communications bus 150, and external communications interface 565 described with respect to FIGS. 1 and 5.

Platform 610 may be similar to platform 110 described with respect to FIG. 1. Wheels 685 may be coupled to platform 610 to enable platform 610 to move about its environment. While illustrated in FIGS. 6A and 4B as wheels, in some examples, wheels 685 may be legs, wings, rotors, or any other device for moving platform 610. Wheels 685 may be coupled to motors, such as motors 155*a* shown in FIG. 1.

Sampler tool 615 may be similar to sampler tool 115 described with respect to FIG. 1. Sampler tool 615 may be a device used to collect samples from the environment about mobile microscope 600. In the example illustrated in FIGS. 6A and 6B, sampler tool 615 is robotic arm with a pick-and-place collection device coupled to one end. Other examples include a shovel capable of scooping up an object, a drill capable of obtaining a core sample, or any other device suitable for collecting a sample from the environment and placing it in a location onboard mobile microscope 600 to enable microscope 620 to image the sample (e.g., in the view field of microscope 620). Sampler tool 615 may be moved using one or more motors, such as motors 155*b* shown in FIG. 1.

Microscope 620 may be any suitable device for magnifying samples such that an image of the sample may be captured by camera 625. Microscope 620 and camera 625 may be similar to microscope 120 and camera 125, respectively, as described with respect to FIG. 1. Microscope 620 may be coupled to platform 610 using any suitable attachment mechanism, such as a clamp, a suction device, glue or other adhesive, bolt or other fastener. Microscope 620 may be controlled using motors, such as motors 155*c* shown in FIG. 1.

Camera 625 may be coupled to microscope 620 via a camera-lens connection and may be used to capture an image of the output from microscope 620. The camera-lens connection may be a solid connection such that microscope 620 and camera 625 move together.

Display 635 and user input device 640 may be installed on a surface of platform 610 such that display 635 is visible to a user and user input device 640 is accessible by the user. Display 635 and user input device 640 may be similar to display 535 and user input device 540, respectively, as described with respect to FIG. 5. While shown on the top surface of platform 610 in FIGS. 6A and 6B, display 635 and user input device 640 may be located on any surface of platform 610.

Sensors 645 may be coupled to platform 610 to obtain data about the environment surrounding mobile microscope 600 and may be similar to sensors 545 described with respect to FIG. 5. While shown on the side surface of platform 610 in FIGS. 6A and 6B, sensors 645 may be located on any surface of platform 610.

GNSS module 675 may be coupled to platform 610 to obtain geo-location data and may be similar to GNSS module 575 described with respect to FIG. 5. While shown on the top surface of platform 610 in FIGS. 6A and 6B, GNSS module 675 may be located on any surface of platform 610.

Solar panel 690 may be coupled to platform 610 to collect solar energy used to recharge one or more batteries onboard mobile microscope 600. While shown on the top surface of platform 610 in FIGS. 6A and 6B, solar panel 690 be located on any surface of platform 610.

Mobile microscope 600 may be deployed as part of a group, or "swarm," of mobile microscopes that may be interconnected to collectively explore a target area. The swarm of mobile microscopes may coordinate with each other to obtain optimal coverage and efficient exploration of the target area and may continuously retrain the neural network of a given mobile microscope based on images and analysis performed by other mobile microscopes in the swarm. The mobile microscopes in the swarm may be controlled from a centralized point, such as external server 210 shown in FIG. 2.

Although examples have been described above, other variations and examples may be made from this disclosure without departing from the spirit and scope of these disclosed examples.

The invention claimed is:

1. A system, comprising:

a platform to move about an environment;

a sampler tool coupled to the platform;

a microscope coupled to the platform;

a camera coupled to the microscope; and a control circuit to:

instruct the platform to move about an environment;

instruct the sampler tool to obtain a sample and place the sample in a view field of the microscope;

instruct the camera to capture an image of an output of the microscope, the output showing the sample as enlarged by the microscope;

receive the image from the camera;

analyze, using a neural network, the image to classify the sample; and output a classification of the sample.

2. The system of claim 1, comprising:

a sensor coupled to the platform to collect a measurement of the environment; and the control circuit to:

create a data record for the sample including the classification of the sample, the image, and the measurement of the environment.

3. The system of claim 2, wherein analysis of the image includes using the measurement of the environment.

4. The system of claim 1, comprising:

a display coupled to the platform; and the control circuit to:

output the classification of the sample and the image to the display.

5. The system of claim 1, wherein the platform includes an external communications interface; and the control circuit to:

output the classification of the sample and the image to a server via the external communications interface.

6. The system of claim 1, comprising:

a user input device coupled to the platform; and the control circuit to:

receive an instruction from the user input device.

7. The system of claim 1, comprising:

a real-time clock/calendar (RTCC) coupled to the control circuit; and the control circuit to:

create a data record for the sample including the classification of the sample, the image, and a time stamp from the RTCC.

8. The system of claim 1, comprising the control circuit to:

retrain the neural network based on the image and the classification of the sample.

9. A method, comprising:

instructing a platform to move about an environment;

instructing a sampler tool coupled to the platform to obtain a sample and place the sample in a view field of a microscope coupled to the platform;

instructing a camera coupled to the microscope to capture an image of an output of the microscope, the output showing the sample as enlarged by the microscope;

receiving the image from the camera;

analyzing, using a neural network, the image to classify the sample; and outputting a classification of the sample.

10. The method of claim 9, comprising:

receiving a measurement of the environment from a sensor coupled to the platform; and creating a data record for the sample including the classification of the sample, the image, and the measurement of the environment.

11. The method of claim 10, wherein analysis of the image includes using the measurement of the environment.

12. The method of claim 9, comprising:

outputting the classification of the sample and the image to a display coupled to the platform.

13. The method of claim 9, comprising:

outputting the classification of the sample and the image to a server via an external communications interface on the platform.

14. The method of claim 9, comprising:

receiving an instruction from a user input device coupled to the platform.

15. The method of claim 9, comprising:

retraining the neural network based on the image and the classification of the sample.

16. An apparatus, comprising:

a control circuit to:

instruct a platform to move about an environment;

instruct a sampler tool coupled to the platform to obtain a sample and place the sample in a view field of a microscope coupled to the platform;

instruct a camera coupled to the microscope to capture an image of an output of the microscope, the output showing the sample as enlarged by the microscope;

receive the image from the camera;

analyze, using a neural network, the image to classify the sample; and output a classification of the sample.

17. The apparatus of claim 16, comprising:

the control circuit to:

receive a measurement of the environment from a sensor coupled to the platform;

analyze the image using the measurement of the environment; and create a data record for the sample including the classification of the sample, the image, and the measurement of the environment.

18. The apparatus of claim 16, comprising:

the control circuit to:

output the classification of the sample and the image to a display coupled to the platform.

19. The apparatus of claim 16, comprising:

the control circuit to:

output the classification of the sample and the image to a server via an external communications interface on the platform.

20. The apparatus of claim 16, comprising:

the control circuit to:

retrain the neural network based on the image and the classification of the sample.

* * * * *